United States Patent [19]

McEwen

[11] 4,316,006

[45] Feb. 16, 1982

[54] POLYMERIC PHOSPHONATES OF A CYCLIC PHOSPHITE AND EPOXIDE

[75] Inventor: Gerald K. McEwen, Midland, Mich.

[73] Assignee: The Dow Chemical Company, Midland, Mich.

[21] Appl. No.: 125,020

[22] Filed: Feb. 27, 1980

[51] Int. Cl.³ .............................................. C08G 79/04
[52] U.S. Cl. .................................... 528/398; 260/929; 260/969; 528/89; 528/90; 528/91; 528/92; 528/72; 528/108
[58] Field of Search .................. 528/108, 398, 89, 91, 528/92, 90; 260/929, 969

[56] References Cited

U.S. PATENT DOCUMENTS

| | | | |
|---|---|---|---|
| 2,871,202 | 1/1959 | Scott | 260/2 |
| 2,893,961 | 7/1959 | McManimie | 260/2 |
| 3,298,967 | 1/1967 | Mason | 260/2 |
| 3,405,075 | 10/1968 | Welch et al. | 528/398 |
| 3,520,849 | 7/1970 | Vandenberg | 260/47 |
| 3,655,586 | 4/1972 | Vandenberg | 528/398 X |
| 3,855,360 | 12/1974 | Shim | 260/969 |
| 3,890,411 | 6/1975 | Shim | 260/969 |
| 3,956,431 | 5/1976 | Honig et al. | 260/971 |
| 3,989,652 | 11/1976 | Shim | 260/2.5 AR |
| 4,087,403 | 5/1978 | Moedritzer | 528/398 X |

*Primary Examiner*—Earl A. Nielsen

[57] ABSTRACT

Phosphorus containing polymers are prepared by copolymerizing a cyclic phosphite and an epoxide in the presence of an acid catalyst. The resulting polymer can be incorporated within a thermoplastic or thermosettable resin to increase the flame resistivity thereof.

20 Claims, No Drawings

POLYMERIC PHOSPHONATES OF A CYCLIC PHOSPHITE AND EPOXIDE

BACKGROUND OF THE INVENTION

This invention relates to phosphorus containing polymers, particularly to those copolymers of a cyclic phosphite and an epoxide.

Due to their thermal insulating character, good electrical resistance and resistance to moisture penetration, many thermoplastic and thermosettable compositions, particularly polyurethane compositions, are used extensively in the construction of refrigerators, truck panels and acoustical tile; as fibers or fabrics; as coatings; and in a wide variety of various other applications.

In many areas of application, the polyurethane compositions are required to exhibit flame resistant properties. Unfortunately, unmodified urethane polymers do not generally exhibit the desired fire resistance. For this reason, phosphorus, in the form of various phosphorus containing compounds and compositions, has been incorporated in the polyurethane compositions. In one method of incorporating phosphorus in a polyurethane composition, phosphorus compounds which are relatively unreactive towards the polyol and polyisocyanate reactants employed in preparing the urethane polymer such as the trialkyl phosphates, e.g., trimethyl phosphate, triethyl phosphate and tris(2-chloroethyl)-phosphate, are added to the reactant mixture or resulting polyurethane. Unfortunately, as such phosphorus compounds are merely physically incorporated within the polyurethane composition, they are subject to losses over a period of time by volatilization, the leaching action of solvents or water, and the like. Moreover, such phosphorus compounds often deleteriously affect the physical properties, e.g., dimensional stability, of the polyurethane composition.

In another method, the incorporation of phosphorus in the polyurethane composition comprises chemically bonding the phosphorus to the urethane polymer such as by preparing the urethane polymer using a suitably reactive phosphorus containing compound. For example, U.S. Pat. No. 3,474,047 discloses a fire-resistant polyurethane of the reaction product of a polyisocyanate, a phosphorus containing polyol prepared by reacting an alkylene oxide and a phosphorus containing acid and, optionally, other compounds reactive with the polyisocyanate such as polyester polyols and polyether polyols. Similarly, other urethane polymers prepared from other phosphorus containing polyols are described in U.S. Pat. Nos. 3,540,849; 3,989,652 and 3,142,651. Unfortunately, due to the presence of a large number of easily hydrolyzable phosphorus-oxygen bonds, the polyurethane compositions prepared from said compounds exhibit reduced hydrolytic stability.

To increase hydrolytic stability, urethane polymers prepared from various phosphorus containing compounds having fewer phosphorus-oxygen bonds have been proposed. For example, U.S. Pat. No. 3,445,405 proposes preparing the polyurethane from a polyisocyanate, a polyol and the condensation product of an alkylene oxide and tris(hydroxymethyl)phosphine oxide. Alternatively, U.S. Pat. No. 3,332,893 discloses a fire-resistant polyurethane can be prepared by combining a halogen containing hydroxyalkyl α-hydroxyalkyl phosphonate with a mixture of a polyol and polyisocyanate and subsequently polymerizing the resulting combination. Unfortunately, such phosphorus containing compounds are relatively expensive and difficult to prepare.

In view of the stated deficiencies of the prior art, it remains highly desirable to provide a readily prepared and relatively inexpensive phosphorus containing compound which is useful in the preparation of hydrolytically stable, thermoplastic and thermosettable compositions having increased resistance to fire.

SUMMARY OF THE INVENTION

Accordingly, one aspect of the present invention is a method for preparing a copolymeric phosphonate which comprises the step of contacting a cyclic phosphite and an epoxide in the presence of an acid catalyst and under conditions sufficient to copolymerize the cyclic phosphite and epoxide.

In another aspect, the present invention is a polymeric phosphonate nominally represented by the formula:

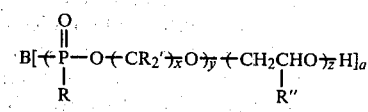

wherein x is an integer from 2 to 4; y and z are individually at least 1; a is an integer from 1 to the number of active hydrogens on the organic active hydrogen initiator; each R is hydrocarbyl or inertly substituted hydrocarbyl; each R' is individually hydrogen, hydrocarbyl or inertly substituted hydrocarbyl; each R'' is hydrogen, hydrocarbyl, inertly substituted hydrocarbyl or a hydroxy containing group; and B is the residue of an active hydrogen initiator provided that if the active hydrogen initiator is an alkyl alcohol, it is a monohydric alkyl alcohol or an alkyl alcohol having three or more hydroxy groups.

In yet another aspect, the present invention is a urethane polymer having chemically bonded therein an amount of the described polymeric phosphonate sufficient to improve the polymer's resistance to fire.

In addition to imparting the desired fire resistance to a polyurethane or other thermoplastic or thermosettable resin composition, the polymeric phosphonates of this invention are more hydrolytically stable than the phosphates and phosphites employed heretofore. They are useful in the preparation of thermoplastic and thermosettable resin compositions, particularly polyurethane compositions, which compositions are useful in the manufacture of refrigerator and truck panels, furniture, fibers, cabinets for electrical equipment, containers and the like.

DETAILED DESCRIPTION OF THE INVENTION

For the purposes of this invention, a phosphonate polymer is a polymer having one or more phosphorus containing groups represented by the formula:

wherein A is a hydrocarbyl or inertly substituted hydrocarbyl provided the atom of the A group bonded directly to the phosphorus atom is not oxygen or sulfur.

As used herein, the term "hydrocarbyl" excludes hydrogen and means a monovalent hydrocarbon group such as alkyl, aryl or aralkyl. An inertly substituted hydrocarbyl is a hydrocarbyl bearing a substituent group such as a halogen which group is inert, i.e., unreactive, during the preparation of the polymeric phosphonate and subsequent treatment, including any reactions, of the resulting polymer.

In this invention, the copolymeric phosphonates are advantageously prepared by the condensation polymerization of a cyclic phosphite and an epoxide. Cyclic phosphites advantageously employed herein are represented by the formula:

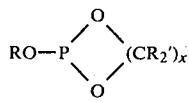 (III)

wherein R is a hydrocarbyl or inertly substituted hydrocarbyl provided the atom bonded directly to the oxygen atom is neither oxygen nor sulfur and each R' is individually hydrogen, hydrocarbyl or inertly substituted hydrocarbyl and x is an integer from 2 to 4, preferably 2. Advantageously, R is an alkyl or inertly substituted alkyl, preferably an alkyl or inertly substituted alkyl group having from 1 to about 6 carbon atoms. Each R' is advantageously hydrogen, an alkyl or inertly substituted alkyl group having from 1 to about 4 carbon atoms, more preferably from 1 to 2 carbon atoms. Most preferably, each R' is hydrogen. Exemplary examples of the most preferred cyclic phosphites are 2-methoxy-1,3,2-dioxaphospholane (methylethylene phosphite); 2-ethoxy-1,3,2-dioxaphospholane (ethylethylene phosphite) and 2-n-butoxy-1,3,2-dioxaphospholane (n-butylethylene phosphite).

As used herein, the term "epoxide" refers to those expoxides of aliphatic, aromatic and alicyclic hydrocarbons, inertly substituted aliphatic, aromatic and alicyclic hydrocarbons or combinations thereof; including oxiranes (i.e., those compounds represented by a

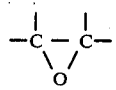

group) and oxetanes (i.e., those compounds represented by the general formula of

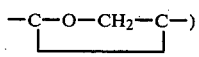

which are capable of copolymerizing with the cyclic phosphite at the conditions hereinafter exemplified Exemplary examples of epoxides advantageously employed herein include ethylene oxide; propylene oxide; oxirane, 2-ethyl; oxirane, 1,2-dimethyl; styrene oxide, glycidol; tert-butyl glycidyl ether; epihalohydrin, e.g., epichlorohydrin; trimethylene oxide; 3,3-bis(chloromethyl) oxetane; 3,3-bis(bromomethyl) oxetane; octylene oxide; di- or polyepoxides such as the diglycidyl ether of a bisphenol such as bisphenol A; and the like. Of particular interest are the epoxides containing a group which, following polymerization of the cyclic phosphite and epoxide, is readily converted to a hydroxycontaining group pendant to the chain of the polymeric phosphonate thereby providing a reactive site for the subsequent reaction of the polymeric phosphonate with a polyisocyanate group in the subsequent preparation of a urethane therefrom. For example, after polymerization of tert-butyl glycidyl ether, i.e.,

and a cyclic phosphite, the tert-butyl group is readily dealkylated using conventional techniques with the resulting dealkylated phosphonate polymer bearing a pendant hydroxy substituted methyl group ($-CH_2OH$).

The amount of each reactant, i.e., the cyclic phosphite and epoxide, can vary significantly, e.g., from about 0.001 to about 100 moles of the epoxide can be employed for each mole of the cyclic phosphite, and the amounts of the reactants most advantageously employed herein will vary depending on the properties desired in the phosphonate polymer and the products prepared therefrom. In general, from about 0.1 to about 20, advantageously from about 2 to about 10, preferably from about 7 to 8, equivalents of epoxide are employed per mole of the cyclic phosphite. As the term is employed herein, "equivalents of epoxide" is the number of oxirane or oxetane groups per molecule of epoxide which groups are sufficiently reactive with the cyclic phosphite such that copolymerization of the reactants can occur at the conditions hereinafter exemplified.

Acid catalysts suitably employed herein are those Lewis acids (which term includes all protonic (Bronsted) acids) capable of catalyzing the polymerization reaction of the cyclic phosphite and epoxide. Representative of such acids are mineral acids such as sulfuric acid and hydrochloric acid; alkyl or aryl sulfonic or phosphonic acids such as p-toluene sulfonic acid and other metal halides such as the halides, advantageously the bromide, chloride or fluoride of aluminum, tin, zinc, antimony, iron, magnesium, boron or the like. Preferred of such Lewis acid catalysts are boron trifluoride and aluminum trichloride with boron trifluoride being most preferred.

The acid catalyst is employed in an amount sufficient to catalyze the condensation polymerization of the cyclic phosphite and epoxide. Typically, such amounts will vary depending on the type and amount of each of the reactants and the reaction conditions employed. Generally, the acid catalyst is employed in amounts from about 0.1 to about 5, preferably from about 0.5 to about 1.5, weight percent based on the total weight of the cyclic phosphite and epoxide.

In the practice of this invention, the cyclic phosphite and epoxide are contacted in the presence of an amount of a Lewis acid catalyst and at conditions sufficient to copolymerize the cyclic phosphite and epoxide.

Although the polymerization reaction may be conducted neat, the reaction is more advantageously conducted in a reaction diluent. In general, reaction diluents advantageously employed herein are relatively volatile (e.g., exhibit a vapor pressure of at least about 10 mm Hg at 25° C. and 760 mm Hg) organic liquids which are inert to both the cyclic phosphite and epoxide and their reaction product. Preferably, both the reactants and the catalyst are soluble in the reaction diluent. While the copolymeric phosphonate does not need to be soluble in the reaction diluent, it is advantageously soluble therein. Representative of organic liquids useful as the reaction diluent in the present invention include chlorinated hydrocarbons such as methylene chloride, 1,2-dichloroethane, perchloroethylene, 1,1,1-trichloroethane; with methylene chloride being most preferred. When employed, the reaction diluent is advantageously employed in amounts from about 10 to about 50, preferably from about 20 to about 25, weight parts per weight parts of the reactants.

An organic active hydrogen initiator, i.e., a compound having a functional group capable of initiating polymerization, is employed to initiate the polymerization. In general, the organic active hydrogen initiators advantageously employed herein are normally liquid mono- and polyhydric alcohols (wherein the term "polyhydric alcohol" refers to a compound containing two or more hydroxy groups). Of such alcohols, the mono- and polyhydric alkyl alcohols such as propanol; butanol; 2,2-dimethyl-1,3-propanediol; 2,2-bis(chloromethyl)-1,3-propanediol; 2,2-bis(bromomethyl)-1,3-propanediol; glycols (e.g., ethylene glycol; 1,3-propylene glycol and 1,4-propylene glycol); glycerol; sorbitol; pentaerythritol; the mono- and polyhydric aromatics such as the aryl alcohols including phenol; bisphenol A; pentachlorophenol; catechol; resorcinol; hydroquinone and 1,1'-isopropylidenebis(p-phenyleneoxy)di-1-propanol; hydroxy terminated polyalkylene polyethers such as the condensation reaction products of ethylene glycol, including diethylene glycol and tetraethylene glycol, and the condensation reaction products of glycerol are preferred herein.

As the residue of the organic active hydrogen initiator is a terminal group of the copolymeric phosphonate and any unreacted hydroxy groups on such residue will provide reactive sites for subsequent reactions such as the reaction of the copolymeric phosphonate with a polyisocyanate to form a urethane polymer, polyhydric alcohols are of particular interest as the organic active hydrogen initiator in this invention. Preferred polyhydric alcohols are alkyl alcohols of three or more hydroxy groups, particularly glycerol, pentaerythritol and sorbitol, and the aryl alcohols containing two or more hydroxy groups; with glycerol being most preferred.

While the amount of the initiator most advantageously employed in the practice of this invention is dependent on the type and amount of the reactants, particularly the cyclic phosphite, in general, from about 0.01 to about 10, preferably from about 0.1 to about 0.5, moles of the initiator are employed per mole of the cyclic phosphite.

The polymerization of the cyclic phosphite and epoxide is advantageously conducted at temperatures from about 25° to about 150° C., the higher reaction temperatures being limited by the temperature at which the reaction diluent boils. Generally, reaction temperatures from about 25° to about 125° C. are preferred, with a reaction temperature from about 25° to about 80° C. being most preferred.

In conducting the polymerization, the order of addition of the reactants, catalyst and initiator is not particularly critical. Advantageously, a mixture of the reactants is added to a mixture of the reaction diluent, catalyst and initiator, while maintaining the reaction mixture at the hereinbefore specified temperatures. While the addition of the reactants may be batchwise, continuous or incremental, i.e., added as shots in two or more increments, their addition is advantageously continuous to help control the heat generated by the exothermic reaction which occurs upon their addition. Generally, such addition is conducted over a period of from about 0.5 to about 4 hours. Following complete addition of the reactants, the reaction mixture is maintained at the hereinbefore specified temperatures until desired completion of the reaction is obtained. In general, the polymerization reaction is sufficiently complete within from about 1 to about 5 hours, which time includes the addition of the reactant.

Following the desired degree of polymerization, the resulting polymeric phosphonate is separated from the remainder of the reaction mixture by conventional means, e.g., stripping all volatiles therefrom. Often, although optionally, it is desirable to remove the lower molecular weight components, e.g., dimers and trimers, from the final product prior to subsequent use. In general, such lower molecular weight components are advantageously removed by conventional solvent extraction techniques.

The resulting copolymeric phosphonate is generally represented by the formula:

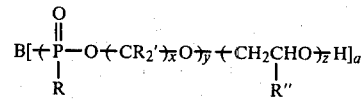

wherein R, R', R", B, a, x, y and z are as hereinbefore described, with y being preferably from about 1 to about 10, more preferably from about 1 to about 2 and z being preferably from about 1 to about 200, more preferably from about 5 to about 15. Such copolymer may advantageously be incorporated within a wide variety of thermoplastic and thermosettable compositions such as polyesters, polyolefins, cellulose esters and ethers, polyvinylidene chloride and the like to impart fire resistance thereto.

Of particular interest in this invention are the polymeric phosphonates which contain two or more hydroxy groups (hereinafter referred to as polymeric phosphonate polyol) sufficiently reactive with a polyisocyanate to form a urethane therefrom. In such manner, the phosphorus is chemically bonded to the urethane polymer and is, therefore, not subject to loss by vaporization, leaching or the like. In the polymeric phosphonate polyol, B is preferably the residue of an alkyl alcohol bearing three or more hydroxy groups or an aryl, aralkyl or cycloalkyl alcohol bearing at least two hydroxy groups or R" is a hydroxy containing substituent group.

The polymeric phosphonates polyol can be employed as the sole polyhydric alcohol coreactive with the polyisocyanate in the preparation of the urethane polymer or it can be employed in conjunction with other polyhydric alcohols. Polyisocyanates (which term includes diisocyanates) and other polyhydric alcohols usefully employed in conjunction with the polymeric phosphonate polyol are those polyisocyanates and polyhydric alcohols employed heretofore in the preparation of polyurethanes. Such polyisocyanates and polyhydric alcohols are well known in the art and reference is made thereto for the purpose of this invention. Toluene-2,4-diisocyanate and toluene-2,6-diisocyanate are the preferred polyisocyanate with ethylene glycol and polyethylene glycol being the preferred polyhydric alcohols.

Urethane polymers are prepared from the polyisocyanate, polymeric phosphonate polyol and, if employed, any other polyhydric alcohols, by conventional techniques well known in the art, with reference being made thereto for the purposes of this invention. In general, the urethane polymers are advantageously prepared by contacting the reactants in the presence of a basic catalyst such as N-methyl morpholine or 2-diethylethanolamine and a surfactant such as a silicone, e.g., polydimethyl siloxane. In preparing a foamed polyurethane, a foaming agent such as a low temperature boiling liquid, e.g., water, or normally gaseous blowing agent, e.g., chlorofluoromethane, is incorporated within the reaction mixture.

In preparing the thermoplastic or thermosettable compositions of this invention, the copolymeric phosphonate is employed in an amount sufficient to measurably increase the fire resistance thereof, i.e., a fire-resistant amount. Preferably, the polymeric phosphonate is employed in an amount sufficient to provide self-extinguishing characteristics to the compositions, said characteristics being determined by conventional techniques such as described in the Examples. In general, such amounts of copolymeric phosphonate will vary depending on the types and amounts of chemical components employed in preparing the composition, the type of the polymeric phosphonate and the desired chemical and physical properties of the resulting polyurethane composition. As an example, in the preparation of a urethane polymer wherein the polymeric phosphonate becomes a chemically bonded integral part thereof, the polymeric phosphonate is employed in an amount such that phosphorus comprises from about 0.1 to about 10, preferably from about 0.1 to about 5, weight percent of the urethane polymer.

To illustrate the preparation of the polymeric phosphonates and their subsequent use in the preparation of urethane polymers, the following examples are presented. The examples should not be construed to limit the scope of the invention. All percentages and parts in the examples are by weight unless otherwise indicated.

EXAMPLE 1

Into a suitable size glass flask equipped with a thermometer, addition funnel, nitrogen purge, dry ice condenser and stirrer are added, with agitation, 60 parts of methylene chloride, about 3.2 parts of boron trifluoride etherate and 18.4 parts glycerol. A mixture of 48.8 parts of 2-methoxy-1,3,2-dioxaphospholane (methylethylene phosphite), 162.4 parts of propylene oxide and 52.1 parts of oxirane, 2-methyl-tert-butyl ether is added dropwise to the resulting solution to maintain the temperature of the reaction medium at about 40° C., such addition taking a period of about 60 minutes. Following complete addition of the reactants, the temperature of the reaction mixture is adjusted to 60° C. and the methylene chloride distilled off, which distillation takes about two hours. At the end of this period, an additional 1.6 g of boron trifluoride is added to the reaction mixture. The temperature of the reaction mixture is then increased to 100° C. and maintained at this increased temperature for about three hours to dealkylate the tert-butyl oxide. The flask is vented during the dealkylation reaction to allow all volatiles to escape. At the end of the reaction period, the reaction mixture is cooled to ambient temperatures, i.e., temperatures from about 18° to about 25° C. The resulting product is about 215 parts of a clear viscous liquid.

To neutralize the resulting product, it is dissolved in 150 parts methylene chloride and the resulting solution is added slowly to 50 parts of an aqueous solution of 5 weight percent sodium hydroxide. The resulting mixture is stirred for about 15 minutes. The stirring is discontinued and the mixture allowed to settle. The organic layer is dried over anhydrous magnesium sulfate. It is then filtered and the methylene chloride is stripped from the remaining material leaving about 200 parts of a clear, syrupy liquid.

A polyurethane foam is prepared from the resulting polymeric phosphonate by adding, with agitation, 119.4 parts of a toluene diisocyanate consisting of 80 percent of toluene-2,4-diisocyanate and 20 percent of toluene-2,6-diisocyanate to a mixture of 20 parts of the copolymeric phosphonate, 80 parts of a polyol mixture comprising 50 weight percent of a polyol having a hydroxyl number of about 450 and 50 weight percent of a polyol having a hydroxyl number of about 640, 0.2 part of a delayed action tin catalyst sold as T-131 by M&T Chemicals, 2 parts of a silicone surfactant sold as DC-197 by Dow Corning, 43.8 parts of trichlorofluoromethane blowing agent and 1 part of a catalyst of dimethylcyclohexylamine. A portion of the resulting polyurethane foam, which contains 0.4 percent phosphorus, is tested for flammability. Flammability testing is conducted by preparing five samples having a length of 19 cm and a width of 9 cm, each sample having a maximum thickness of less than about 15 mm. The samples are stored for at least about 14 days prior to testing in an environmental chamber of 20° C. and 65 percent relative humidity. Each sample is ignited in a draft-free environment while hanging vertically lengthwise by a holding clamp attached to the upper part of the sample. Ignition is performed by a small burner inclined at a 45° angle (internal diameter of 1±0.05 mm), which burner has a propane gas attachment and a 20 mm blue flame. The flame is placed centrally under the lower end of the sample for 15 seconds and then withdrawn. Using such test method, none of the test samples are found to burn with flaming combustion upon removal of the flame. It should be noted, however, that all known synthetic polymers will burn when subjected to a sufficiently intense heat source. Thus, the test results may not reflect the properties of the polymer composition under actual fire conditions. Another portion of the polyurethane foam is tested for hydrolytic stability using the humidity aging test designated as ASTM D-2126, Procedure C. By such method, the percent volume increase of the foam is found to be 4.9 percent.

EXAMPLE 2

In a manner similar to Example 1, a polymeric phosphonate is prepared from 53.3 parts pentachlorophenol, 48.8 parts 2-methoxy-1,3,2-dioxaphospholane, 116 parts propylene oxide, 104 parts oxirane, methyl tert-butyl ether. The resulting phosphonate is a yellow-brown liquid comprised of about 4.5 percent phosphorus, 28 percent oxygen, 47.3 percent carbon, 7.2 percent hydrogen and 13 percent chlorine.

Following the procedure of Example 1, a rigid polyurethane foam is prepared by reacting 118.6 parts of methylene di-para-phenylene isocyanate with 20 parts of the polymeric phosphonate and 80 parts of a polyol mixture of 50 weight percent of a polyol having a hydroxyl number of about 450 and 50 weight percent of a polyol having a hydroxyl number of about 640 in the presence of catalysts, surfactant and blowing agent; the type and concentration of each being exemplified in Example 1. When tested for flammability according to the test method outlined in Example 1, the resulting polyurethane foam, which contains about 0.4 weight percent phosphorus, is not found to burn upon removal of the flame. The percent volume increase of the foam upon humidity aging (ASTM D-2126, Procedure C) is found to be 6.3 percent.

What is claimed is:

1. A polymeric phosphonate of the formula:

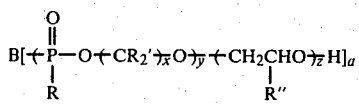

wherein x is an integer from 2 to 4; y and z are individually at least 1; R is individually hydrocarbyl or inertly substituted hydrocarbyl; each R' is individually hydrogen, hydrocarbyl or inertly substituted hydrocarbyl; each R" is hydrogen, hydrocarbyl, inertly substituted hydrocarbyl or a hydroxy containing group; B is the residue of an organic, active hydrogen initiator provided that if the active hydrogen initiator is an alkyl alcohol, it is a monohydric alcohol or an alkyl alcohol having three or more hydroxy groups; and a is an integer from 1 to the number of active hydrogens on the organic active hydrogen initiator.

2. The polymeric phosphonate of claim 1 wherein each R' is individually hydrogen or an alkyl of one or two carbon atoms and R is an alkyl or inertly substituted alkyl having from 1 to about 6 carbon atoms.

3. The polymeric phosphonate of claim 2 wherein each R' is hydrogen, R is an alkyl group having from 1 to about 6 carbon atoms and x is 2.

4. The polymeric phosphonate of claim 1 wherein B is the residue of a mono- or polyhydric alcohol.

5. The polymeric phosphonate of claim 4 wherein B is the residue of an alkyl alcohol, an aryl alcohol or a hydroxy terminated polyalkylene polyether.

6. The polymeric phosphonate of claim 5 wherein B is the residue of glycerol, erythritol, pentaerythritol, sorbitol, phenol, pentachlorophenol, catechol, resorcinol, hydroquinone or the condensation reaction product of ethylene glycol or glycerol.

7. The polymeric phosphonate of claim 6 wherein each R' is hydrogen, R is an alkyl group having from 1 to about 6 carbon atoms and x is 2.

8. The polymeric phosphonate of claim 1 wherein R" is a hydroxy containing group.

9. A method for preparing a copolymeric phosphonate which method comprises the step of contacting a cyclic phosphite and an epoxide in the presence of an acid catalyst and under conditions sufficient to copolymerize the cyclic phosphite and epoxide.

10. The method of claim 9 wherein the cyclic phosphite is represented by the formula:

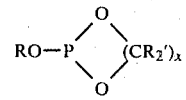

wherein R is a hydrocarbyl or inertly substituted hydrocarbyl provided the atom bonded to the oxygen atom is neither oxygen or sulfur, each R' is individually hydrogen, hydrocarbyl or inertly substituted hydrocarbyl and x is an integer from 2 to 4.

11. The method of claim 10 wherein R is an alkyl or inertly substituted alkyl and each R' is individually hydrogen, an alkyl or inertly substituted alkyl.

12. The method of claim 9 wherein the cyclic phosphite is 2-methoxy-1,3,2-dioxaphospholane; 2-ethoxy-1,3,2-dioxaphospholane or 2-n-butoxy-1,3,2-dioxaphospholane.

13. The method of claim 9 wherein the epoxide is ethylene oxide; propylene oxide; oxirane, 1,2-dimethyl; styrene oxide, glycidol; oxirane, 1,2-diethyl; oxirane, tert-butyl glycidyl ether; an epihalohydrin; trimethylene oxide; 1,3-bis(chloromethyl)oxetane; 3,3-bis(bromomethyl) oxetane; octylene oxide or the di- or polyglycidyl ethers of a bisphenol.

14. The method of claim 9 wherein the acid catalyst is a mineral acid, an alkyl or aryl sulfonic or phosphoric acid or a metal halide.

15. The method of claim 14 wherein the acid catalyst is a metal halide and is employed in an amount from about 0.1 to about 5 weight percent based on the weight of the cyclic phosphite and epoxide.

16. The method of claim 14 wherein from about 0.1 to about 20 equivalents of epoxide are employed per mole of the cyclic phosphite.

17. The method of claim 9 wherein an organic active hydrogen initiator is employed to initiate polymerization of the cyclic phosphite and the epoxide.

18. The method of claim 17 wherein the organic active hydrogen initiator is an alkyl alcohol, an aryl alcohol or a hydroxy terminated polyalkylene polyether.

19. The method of claim 17 wherein the reaction is conducted in a reaction diluent of a chlorinated hydrocarbon and the reaction is conducted at a temperature from about 25° to about 150° C.

20. The method of claim 19 wherein the acid catalyst is boron trifluoride or aluminum trichloride and is employed in an amount from about 0.5 to about 1.5 weight percent based on the weight of the epoxide and cyclic phosphite; the epoxide is ethylene oxide, propylene oxide or oxirane, tert-butyl glycidyl ether; the cyclic phosphite is 2-methyl-1,3-dioxaphospholane, 2-ethoxy-1,3-dioxaphospholane or 2-butoxy-1,-3-dioxaphospholane; from about 2 to about 20 equivalents of epoxide are employed per mole of the cyclic phosphite; the reaction diluent is methylene chloride, 1,2-dichloroethane, perchloroethylene or 1,1,1-trichloroethane and the reaction is conducted at a temperature from about 25° to about 80° C.

* * * * *